Aug. 11, 1959 P. E. HITCH ET AL 2,899,026
COOLING SYSTEM FOR FLUID OPERATED BRAKE
Filed Sept. 24, 1956 2 Sheets-Sheet 1

INVENTORS
Paul E. Hitch &
BY John W. Walsh
J. W. Lovett
ATTORNEY

INVENTORS
Paul E. Hitch &
BY John W. Walsh
J. W. Lovett
ATTORNEY

United States Patent Office 2,899,026
Patented Aug. 11, 1959

2,899,026

COOLING SYSTEM FOR FLUID OPERATED BRAKE

Paul E. Hitch, Birmingham, Mich., and John W. Walsh, Lockport, N.Y., assignors to General Motors Corporation, Detroit, Mich., a corporation of Delaware Application September 24, 1956, Serial No. 611,473

2 Claims. (Cl. 188—264)

This invention relates to cooling systems on automotive vehicles and more particularly to cooling systems affecting engine coolants and brake liquid coolants or fluids.

It has heretofore been found advantageous, particularly in the use of heavy vehicles, to supplement the action of conventional wheel brakes with a power absorption or hydrodynamic type of brake associated with the vehicle transmission. A brake of this type is an extremely effective device wherein the braking effort is converted into heat absorbed in the oil or fluid utilized by the brake. This heat must be given off and it has been convenient to conduct heated oil from the brake into a heat transfer relationship with the engine coolant.

The dissipation of heat absorbed in a braking effort by means of a heat exchanger is taught in such disclosures as given in the United States Patents 1,633,136, granted June 21, 1927, in the name of Henry B. Shields, 2,126,751, granted August 16, 1938, in the name of Robert Griffin De La Mater, and 2,541,227, granted February 13, 1951, in the name of Howard J. Findley.

The circulation of coolant from the engine jacket and through an entire radiator when the engine is at normal operating temperature is conventional and it is common practice, when the engine is being warmed up, to delay the coolant circulation through the radiator by means of thermostatic valve means by-passing the radiator. By-passing of the radiator continues until the engine warms up in which event a main valve thermostatically opens and normal circulation through the radiator ensues. Such thermostatic valve means are disclosed in the United States Patents 2,323,533, granted July 6, 1943, in the name of Jean V. Giesler and 2,244,932, granted June 10, 1941, in the name of Otlin L. Anderson.

It has now been found that, as heretofore practiced, a heat exchange between a transmission brake fluid and an engine coolant is often not adequate when the radiator is by-passed, i.e. when the engine is at below operating temperature and the above referred to thermostatic main valve is closed. The brake fluid becomes too hot and damage to the mechanical parts involved often occurs.

An object of the present invention is to provide an improved cooling system for cooling the fluid in a vehicle brake of the hydrodynamic type. Another object is to provide a cooling system which is effective to cool an engine and a hydrodynamic brake when hte engine is at below normal operating or at subnormal operating temperature.

To these ends, a feature of the present invention includes conduit means and valve means for by-passing the inlet tank and core of an engine radiator so that coolant in the engine jacket may be circulated through an outlet tank of the radiator in heat exchange with fluid from a hydrodynamic brake. Another feature includes thermostatic valve means including a main valve controlling normal engine coolant circulation through a radiator and a by-pass valve spring loaded toward the main valve for directing coolant through an outlet tank of the radiator under subnormal temperature conditions of the engine coolant.

These and other important features and characteristics of the invention will now be described in detail and then pointed out more particularly in the appended claims.

Figure 1:
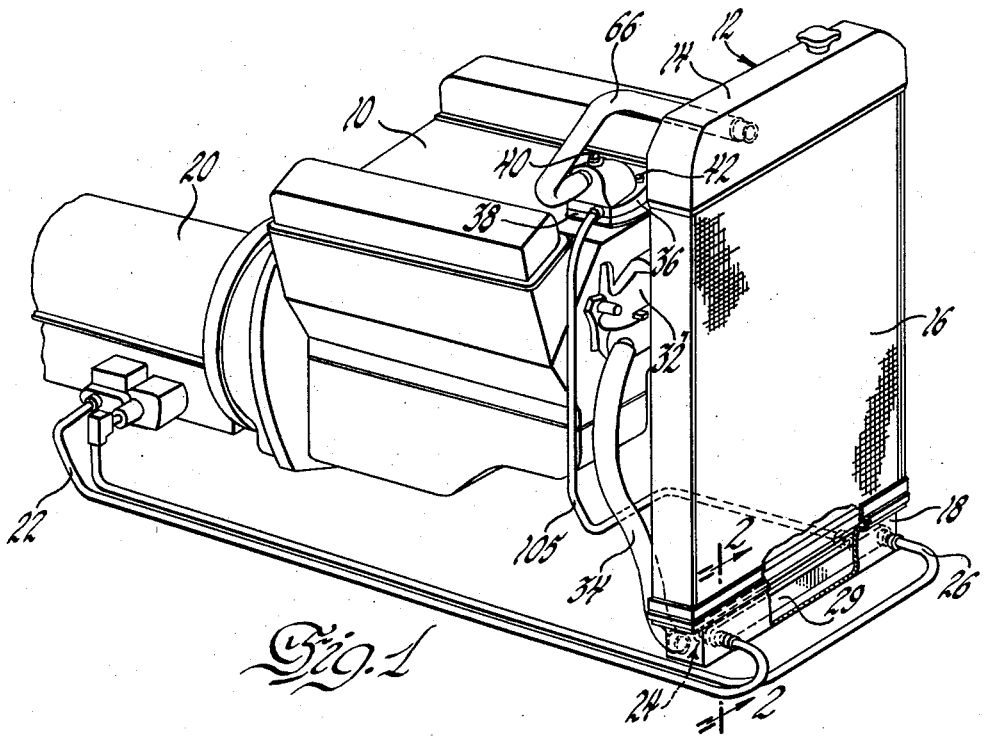
Fig. 1 is a perspective view of an automotive engine of the internal combustion type with an associated radiator and a transmission of the type embodying a hydrodynamic brake.

In Fig. 1 an internal combustion engine 10 is shown which is water jacketed as is conventional. This engine is cooled by the use of a water radiator generally indicated at 12 having an upper or intake tank 14, a core 16 and an outlet or lower tank 18. The engine is arranged to drive a transmission enclosed within the housing 20 and which incorporates a fluid operated brake which is not shown in detail as it forms no part of the present invention.

Figure 2:
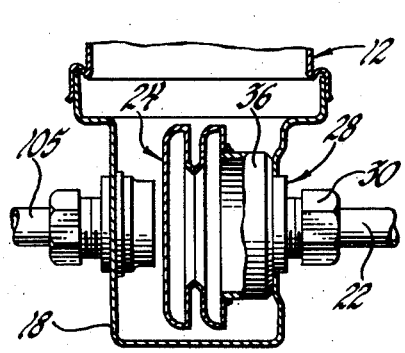
Fig. 2 is an enlarged view taken in section and looking in the direction of the arrows 2—2 in Fig. 1 to show structural details.
Figure 3:
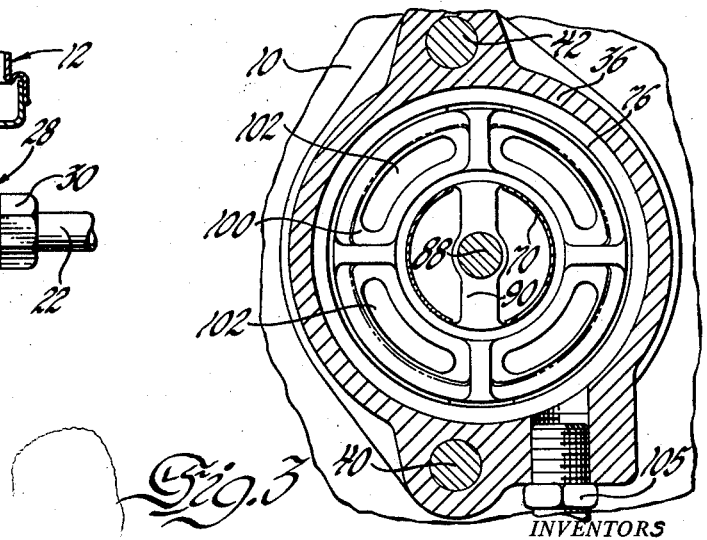
Fig. 3 is a sectional view taken along the lines 3—3 in Fig. 4.

The brake is cooled by withdrawing oil therefrom through a line 22 and directing the same into one end of a heat exchanger 24 supported within the outlet tank 18 of the radiator. Another line 26 connects the other end of the heat exchanger 24 back to the brake. The heat exchanger 24 may take various forms and it need not be within the tank 18 as is obvious. It is preferred, however, that it be enclosed within the tank and in a form which is elongated and somewhat H-shaped in cross section, as may be seen in Fig. 2 of the drawings. The line 22 is suitably connected to the exchanger 24 by a coupling means generally indicated at 28. The coupling means may also take various forms although it is shown as incorporating the packing nut 30 and a short tube section 32. Further details regarding the coupling are not set forth herein as many other forms of devices may be employed suitable for forming a fluid tight connection between the line 22, the wall of the tank 18 and the exchanger 24. One end of the line 26 is connected to the other end of the exchanger 24 in a similar manner.

A housing 32' is located on front of the engine and encloses a coolant pump adapted to be operated by the engine in a conventional manner. The intake of the pump is connected to one end of the outlet tank by means of a hose 34.

The top of the engine is fitted with two superimposed blocks 36 and 38 which are rigidly fixed to the engine by means of bolts 40 and 42. Gaskets 44 and 46 are utilized to insure that there is no leakage at the junction between the blocks and between the engine and the block 38. The engine 10 has a vertically extending passage 48 from which coolant flows from the engine jacket. A port 50 in the block 38 registers with the passage 48 in the engine block and communicates with a chamber 52 formed in the block. The block 36 defines a chamber 54 and this chamber, together with the chamber 52, holds a thermostatic valve means generally indicated at 56.

The chamber 54 is defined on its upper side by a partition 60 formed in the block 36, and above the partition is a second chamber 62 communicating with a tubular side extension 64 to form a fluid connection with a conduit 66 leading to the intake tank 14 of the radiator 12. The partition 60 is apertured as at 68 for the reception of an upper portion 70 of the valve means 56. A gasket 72 is interposed between the partition 60 and a horizontal flange 74 formed on the portion 70. The latter is fixed to or forms part of a cup-like frame 76 of the valve means 56. The frame bears an annular and outwardly extending flange 78 which is held in position in a suitable recess in the block 38 by being interposed under the gasket 44 and the block 36. A subframe 80 comprising three legs and a center disk 82 is suspended from the frame 76. Supported on and fixed to the disk 82 is one end of a metallic bellows 84 which is thermosensitive. An upper end plate 86 of the bellows is rigidly fixed to one end of a vertical pin 88 which is adapted to slide vertically through an aperture in a cross member 90 integral with the frame 76. The upper end of the stem 88 is threaded as at 94 to receive a main valve 96 of the poppet type. An upper portion of the frame 76 bears four horizontal depressions 100 each of which is apertured as at 102. Slidably mounted on the pin 88 is a by-pass valve 104 which bears an annular portion 106 of the proper inner and outer diameters to engage and close off the ports 102, as seen in Fig. 5. The by-pass valve 104 is apertured as at 108 for the passage of fluid and bears spokes 110 which are joined to an annular member 112 (Fig. 4) slidably mounted on the pin and retaining the lower end of a coiled spring 114. This spring is under compression between the cross member 90 of the frame 76 and the by-pass valve 104. A by-pass line 105 connects the chamber 54 with the outlet tank 18 of the radiator. It is to be noted that the hose 34 and the line 105 are connected to opposite ends of the tank.

Figure 4:
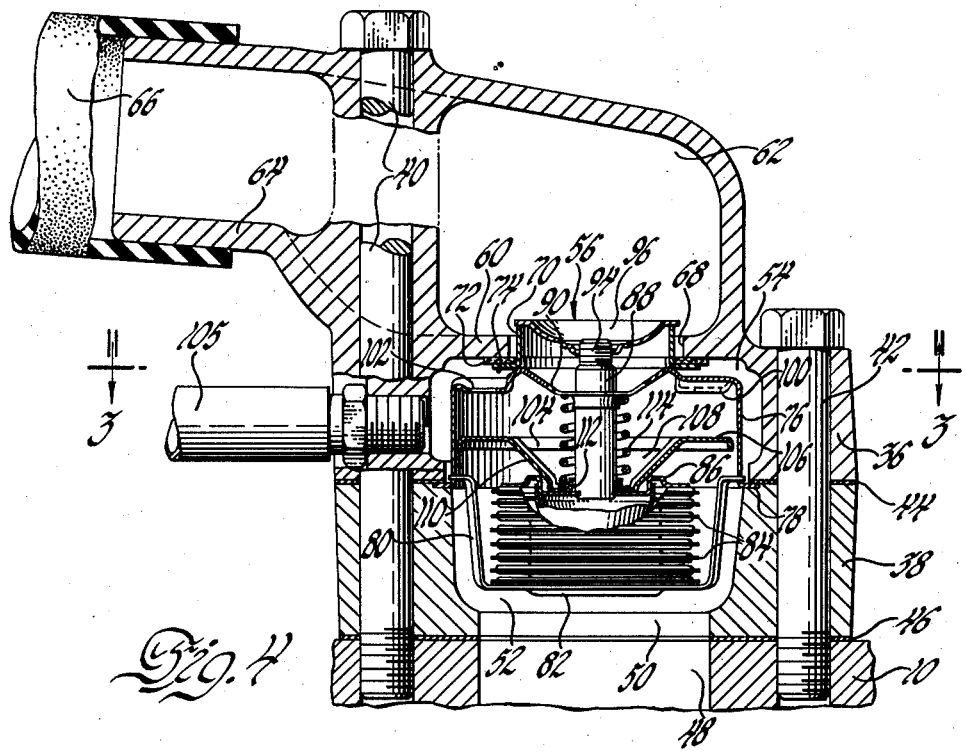
Fig. 4 is an enlarged and sectional view taken in a vertical plane through a thermostatic valve and its supporting assembly as utilized in the arrangement of Fig. 1, the parts being positioned for by-passing a radiator core, i.e. for subnormal conditions of operation.
Figure 5:
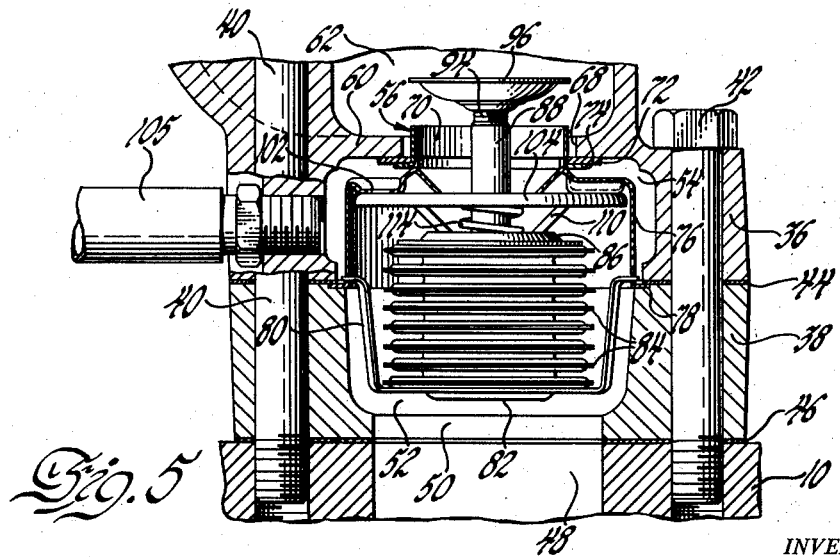
Fig. 5 is a view similar to that of Fig. 4, but with the thermostatic valve parts positioned for normal coolant circulation.

Upon starting the motor 10 with the coolant therein cold, the bellows 84 will be contracted, as shown in Fig. 4, holding the main valve 96 in its closed position. Action of the pump 32 will thereby cause circulation of the engine coolant up through the port 50, into the chamber 52 and then by way of the ports 102 and the by-pass line 105 into one end of the outlet tank 18. This fluid will then flow along the length of the tank 18 in contact with the exterior of the heat exchanger 24 and be returned to the pump by way of the conduit 34. Because of this circulation, a cooling effect is imparted to the exchanger 24 by not only the coolant in the jacket of the engine 10, but also by coolant in the radiator, i.e. the circulation of the engine coolant is through the engine jacket and the outlet tank part of the radiator. Because of this arrangement, the cooling effect is adequate under all conditions and especially advantageous when the main thermostatic valve 96 is closed.

Under normal operating conditions; that is, when the engine 10 is operating with the engine and its coolant properly heated, the bellows 84 will cause the main valve 96 to be open, as seen in Fig. 5. This will be accompanied by a closure of the ports 102 because of the elevation of the valve 104. The spring 114 will compress and the force of the spring is exerted through the valve 104 against the frame 76. With these positions of the valves 96 and 104, the engine coolant will be forced by the pump 32 to pass through the engine jacket, then upwardly by way of the passage 48 and through the member 70 and the chamber 62 as well as the conduit 66 into the top tank 14 of the radiator. Under normal operating conditions, therefore, the full cooling effect of the radiator 12 is utilized and, of course, adequate cooling is had for both the brake and the engine.

As stated heretofore, the valve 104 is slidable on the stem 88 and the spring 114 serves to hold the inner periphery of the valve down against the top plate 86 of the bellows. With this construction, the valves 104 and 96 are independently movable and yet, when the valves are positioned as shown in Fig. 4, any tendency of the by-passing coolant to force the valve 56 upwardly from its seat prematurely is avoided. This is because the force of the fluid is partially exerted against the underside of the valve 104 for absorption by the frame 76 through the spring 114. In short, with the by-pass circulation in effect, the use of the spring 114 avoids premature opening of the valve 96. Obviously, the main valve 96 should not open until the engine temperature is elevated to give the desired engine efficiency.

We claim:

1. A cooling system on a vehicle fitted with a brake operated by fluid, an engine having a jacket for liquid coolant, an air cooled radiator, conduits and a pump connecting said jacket and radiator for normal coolant circulation, a heat exchanger in a portion of said radiator and in contact with said engine coolant, means for conducting said brake fluid through said heat exchanger, a by-pass conduit connecting said jacket with said radiator portion, temperature sensitive valve means arranged, when the temperature of said engine is low, to direct said coolant through said by-pass conduit for abnormal circulation through said jacket and radiator portion and by-pass the remainder of said radiator.

2. A cooling system on a vehicle fitted with a brake operated by fluid, an engine having a jacket for liquid coolant, an air cooled radiator, conduits and a pump connecting said jacket and radiator for coolant circulation when said engine is operating under normal conditions, an elongated heat exchanger in a low portion of said radiator, means for conducting said brake fluid through said heat exchanger, a by-pass conduit connecting said jacket with said low radiator portion for abnormal circulation along the length of said heat exchanger when said engine is cold, temperature sensitive valve means arranged to effect normal circulation through the entire radiator when normal operating temperature of said engine is attained.

References Cited in the file of this patent

UNITED STATES PATENTS

| | | |
|---|---|---|
| 1,598,738 | Mead et al. | Sept. 7, 1926 |
| 1,915,547 | North et al. | June 27, 1933 |
| 2,008,164 | Wolf | July 16, 1935 |
| 2,070,092 | Ramsaur | Feb. 9, 1937 |
| 2,127,557 | Ells | Aug. 23, 1938 |
| 2,195,130 | Hoyt | Mar. 26, 1940 |
| 2,390,436 | Gunter | Dec. 4, 1945 |
| 2,541,227 | Findley | Feb. 13, 1951 |
| 2,670,933 | Bay | Mar. 2, 1954 |
| 2,788,870 | Heck | Apr. 16, 1957 |

FOREIGN PATENTS

| | | |
|---|---|---|
| 334,760 | Great Britain | Sept. 11, 1930 |